(12) United States Patent
Yano et al.

(10) Patent No.: US 7,153,911 B2
(45) Date of Patent: Dec. 26, 2006

(54) CURABLE COMPOSITION

(75) Inventors: Ayako Yano, Kakogawa (JP); Junji Takase, Akashi (JP)

(73) Assignee: Kaneka Corporation, Osaka (JP)

(*) Notice: Subject to any disclaimer, the term of this patent is extended or adjusted under 35 U.S.C. 154(b) by 206 days.

(21) Appl. No.: 10/495,767

(22) PCT Filed: Nov. 29, 2002

(86) PCT No.: PCT/JP02/12477

§ 371 (c)(1),
(2), (4) Date: May 17, 2004

(87) PCT Pub. No.: WO03/046079

PCT Pub. Date: Jun. 5, 2003

(65) Prior Publication Data

US 2004/0266950 A1 Dec. 30, 2004

(30) Foreign Application Priority Data

Nov. 29, 2001 (JP) ............................. 2001-364015

(51) Int. Cl.
*C08F 283/06* (2006.01)
(52) U.S. Cl. ..................................... 525/404; 528/901
(58) Field of Classification Search ................ 525/404; 528/901
See application file for complete search history.

(56) References Cited

U.S. PATENT DOCUMENTS 5,541,274 A 7/1996 Steinmann
5,910,555 A * 6/1999 Ueda et al. .................. 528/34

FOREIGN PATENT DOCUMENTS

| EP | 0293253 A1 | 11/1988 |
| EP | 1055669 A1 | 11/2000 |
| JP | 62-181360 A | 8/1987 |
| JP | 11-012455 A | 1/1999 |
| JP | 2000-119262 A | 4/2000 |
| JP | 2001-011278 A | 1/2001 |
| JP | 2001-049113 A | 2/2001 |
| JP | 2001-114841 A | 4/2001 |
| JP | 2001-164236 A | 6/2001 |
| JP | 2001-234072 A | 8/2001 |
| JP | 2002-121407 A | 4/2002 |
| JP | 2002-226522 A | 8/2002 |

OTHER PUBLICATIONS

Translation of JP 2001-234072.*
English International Search Report for PCT/JP02/12477, Feb. 25, 2003.

* cited by examiner

*Primary Examiner*—Kuo-Liang Peng
(74) *Attorney, Agent, or Firm*—Kenyon & Kenyon LLP

(57) ABSTRACT

The invention provides a curable composition which comprises a polyoxyalkylene polymer having a reactive silicon group and a (meth)acrylate copolymer and exhibits excellent weather resistance for a prolonged period. This composition comprises 100 parts by weight of a polyoxyalkylene polymer (A) having at least one silicon-containing functional group capable of causing crosslinking through the formation of a siloxane linkage and 20 to 1000 parts by weight of a (meth)acrylate copolymer (B) having a hindered amine structure.

7 Claims, No Drawings

CURABLE COMPOSITION

This application is a 371 national phase application of PCT/JP02/12477 filed on 29 Nov. 2002, claiming priority to JP 2001-364015, filed on 29 Nov. 2001, the contents of which are incorporated herein by reference in their entirety.

TECHNICAL FIELD

The present invention relates to a curable composition containing a polyoxyalkylene polymer having a functional group containing a silicon (hereinafter referred to as a reactive silicon group in some cases) which can be crosslinked by forming a siloxane bond, and a (meth)acrylic ester copolymer. The (meth)acrylic esters in the present invention include acrylic esters and/or methacrylic esters.

BACKGROUND ART

Polyoxyalkylene polymers having a reactive silicon group have been disclosed in, for example, Japanese Unexamined Patent Application Publication Nos. 61-141761, 61-218632, 61-233043, 1-171683, 1-279958, and 10-060253.

Room-temperature curable compositions which react with moisture in the air to cure into a rubber form are stable in storage, weather-resistant, heat-resistant, and contamination-resistant, and broadly used as sealant, adhesive, coating material, and so forth accordingly. Polyoxyalkylene polymers having a reactive silicon group are weather-resistant and suitable for sealant. However, as nice appearance is increasingly desired for housing, further enhanced weather resistance is desired.

In order to enhance the weather resistance, for example, Japanese Unexamined Patent Application Publication Nos. 61-233043 and 2001-164236 have disclosed a technique of compounding an additive-type UV absorbent or light stabilizer. However, since the additive-type UV absorbent and light stabilizer bleed to the surface, it is difficult to maintain the weather resistance over a long period.

In order to enhance the weather resistance, for example, Japanese Unexamined Patent Application Publication No. 59-122541 has disclosed a technique of blending an acrylic copolymer with a polyoxyalkylene polymer having a reactive silicon group, and says that this technique can significantly improve the weather resistance. However, it has found that long-time exposure degrades the weather resistance. Accordingly, still further enhanced weather resistance is desired.

Japanese Unexamined Patent Application Publication No. 2001-234072 has disclosed a modified silicone room-temperature curable composition containing: (A) 100 parts by weight of a modified silicone room-temperature curable polymer having a reactive silyl group and whose principal chain is polyether; (B) 0.01 to 20 parts by weight of a silane compound containing an amino group; (C) 2 to 20 parts by weight of a macromolecular UV absorbent containing 0 to 2 percent by weight of a polymerizable hindered amine compound as a constitutional unit; and (D) 0.01 to 20 parts by weight of a tin curing catalyst. Although this compound helps prevent the UV absorbent and the light stabilizer from bleeding, effectively, it does not lead to a sufficiently enhanced weather resistance, which has recently been desired.

SUMMARY OF THE INVENTION

In view of the above-described circumstances, the object of the present invention is to enhance the weather resistance over a long period of curable compositions containing a polyoxyalkylene polymer having a reactive silicon group and a (meth)acrylic ester copolymer.

The inventors of the present invention have conducted intensive research to overcome the above-described disadvantages, and consequently found that the weather resistance of a curable composition containing a polyoxyalkylene polymer having a reactive silicon group and a (meth)acrylic ester copolymer having a hindered amine structure is dramatically improved in comparison with that of a system in which a hindered amine compound is simply added to a combination of a polyoxyalkylene polymer having a reactive silicon group and a (meth)acrylic ester copolymer.

Specifically, the present invention relates to a curable composition containing: 100 parts by weight of polyoxyalkylene polymer (A) having at least one functional group containing silicon which can be crosslinked by forming a siloxane bond; and 20 to 1,000 parts by weight of a (meth)acrylic ester copolymer (B) having a hindered amine structure.

Preferably, the (meth)acrylic ester copolymer (B) is prepared by copolymerizing a reactive hindered amine compound expressed by Formula (I).

Formula (I):

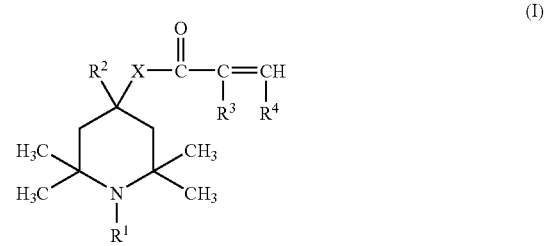

(where $R^1$ represents a hydrogen atom or an alkyl group having a carbon number in the range of 1 to 18, $R^2$ represents a hydrogen atom or a cyano group, $R^3$ represents a hydrogen atom or an alkyl group having a carbon number of 1 or 2, $R^4$ represents a hydrogen atom or an alkyl group having a carbon number of 1 or 2, and X represents an oxygen atom or an imino group).

More preferably, at least one of (meth)acrylic ester monomer units constituting the (meth)acrylic ester copolymer (B) has an alkyl group having a carbon number of 8 or more.

Still more preferably, the (meth)acrylic ester copolymer (B) is prepared by copolymerizing a vinyl monomer having a reactive silicon group.

Still more preferably, the functional group containing silicon of the polyoxyalkylene polymer (A) is a reactive alkoxysilyl group.

DETAILED DISCLOSURE OF INVENTION

The polyoxyalkylene polymer (A) used in the present invention (hereinafter referred to as the polyoxyalkylene polymer (A)) is shown in Japanese Examined Patent Application Publication Nos. 45-36319, 46-12154, and 49-32673, and Japanese Unexamined Patent Application Publication Nos. 50-156599, 51-73561, 54-6096, 55-82123, 55-123620, 55-125121, 55-131022, 55-135135, and 55-137129.

Preferably the chain of the polyoxyalkylene polymer (A) is constituted of a repeating unit expressed by Formula (II):

  (II)

(where $R^5$ represents a divalent organic group, preferably a divalent hydrocarbon group, and most preferably most groups represented by $R^5$ are hydrocarbon groups having a carbon number of 3 or 4). Exemplary groups represented by $R^5$ include —CH(CH$_3$)—CH$_2$—, —CH(C$_2$H$_5$)—CH$_2$—, —C(CH$_3$)$_2$—CH$_2$—, and —CH$_2$CH$_2$CH$_2$CH$_2$—. While the chain of the polyoxyalkylene polymer (A) may be formed of a single type of repeating unit or at least two types of repeating unit, $R^5$ is preferably —CH(CH$_3$)—CH$_2$—, particularly from the viewpoint of appropriately reducing the viscosity of the polymer and giving a suitable flexibility to the resulting cured material.

The polyoxyalkylene polymer (A) may have a normal chain or a branched chain, or a mixed structure of these chains. Although the polyoxyalkylene polymer (A) may contain another monomer unit, it is preferable that this monomer contain at least 50 percent by weight, more preferably at least 80 percent by weight, of a repeating unit expressed by —CH(CH$_3$)—CH$_2$—O—, from the viewpoint of obtaining good workability and giving a flexibility to the resulting cured material.

The functional group containing silicon (reactive silicon group) of the polyoxyalkylene polymer (A) which can be crosslinked by forming a siloxane bond has been generally known, and it can be crosslinked even at room temperature. A typical reactive silicon group is expressed by Formula (III):

  (III)

(wherein $R^6$ represents a substituted or unsubstituted monovalent organic group having a carbon number in the range of 1 to 20, preferably a monovalent hydrocarbon group, or a triorganosiloxy group, and if the number of groups $R^6$ is at least two, they may be the same or different; Y represents the hydroxy group or a hydrolyzable group, and if the number of groups Y is at least two, they may be the same or different; a represents an integer of 0, 1, or 2 and b represents an integer of 1, 2, or 3, while the relationship a=2 and b=3 does not hold; and m represents an integer in the range of 0 to 18). From the viewpoint of economical efficiency, preferably, the reactive silicon group is expressed by Formula (IV):

  (IV)

(where $R^6$ is the same as above, and n represents an integer of 0, 1, or 2).

Exemplary hydrolyzable groups expressed by Y in Formulas (III) and (IV) include halogen, hydrogen, alkoxyl, acyloxy, ketoximate, amino, amido, aminoxy, mercapto, and alkenyloxy. Among these groups, alkoxyl groups, such as methoxy and ethoxy, are preferable from the viewpoint of mild hydrolysis.

Exemplary groups expressed by $R^6$ in Formulas (III) and (IV) include alkyl groups having a carbon number in the range of 1 to 20, such as methyl and ethyl, cycloalkyl groups having a carbon number in the range of 3 to 20, such as cyclohexyl, aryl groups having a carbon number in the range of 6 to 20, such as phenyl, and aralkyl groups having a carbon number in the range of 7 to 20, such as benzyl. $R^6$ may also be a triorganosiloxy group expressed by the formula $(R^6)_3$SiO—, wherein $R^6$ is the same as above. In particular, $R^6$ in Formulas (III) and (IV) is preferably the methyl group from the viewpoint of ensuring an appropriate reactivity.

Preferably, the polyoxyalkylene polymer (A) has at least one reactive silicon group, and more preferably 1.1 to 5 reactive silicon groups, in its molecule on an average. A polyoxyalkylene polymer (A) having less than one reactive silicon group in its molecule makes the curing properties insufficient and does not provide good rubber elasticity. On the other hand, a number of reactive silicon groups of more than 5 causes the resulting cured material to be hardened and degrades the adaptability to joints, disadvantageously.

The reactive silicon group may be present at an end of the chain of the polyoxyalkylene polymer (A) or inside the chain. If the reactive silicon group is present at the end of the chain, the number of the effective network chains of the polyoxyalkylene polymer (A) contained in the resulting cured material is increased. Accordingly, a rubbery cured material can be easily provided, exhibiting a higher strength and elongation and a lower elasticity.

The number average molecular weight (Mn) of the polyoxyalkylene polymer (A) is not particularly limited, but normally in the range of 500 to 100,000, preferably in the range of 2,000 to 60,000, and more preferably in the range of 5,000 to 30,000, from the viewpoint of the viscosity of the polymer and the rubber elasticity of the resulting cured material. In the present invention, the number average molecular weight of the polyoxyalkylene polymer (A) was obtained in terms of polystyrene by gel permeation chromatography (GPC).

Preferably, the polyoxyalkylene polymer (A) having the reactive silicon group is prepared by introducing the reactive silicon group to a polyoxyalkylene polymer having a functional group. The polyoxyalkylene polymer having a functional group is prepared by common polymerization (anionic polymerization using an alkali hydroxide) for producing polyoxyalkylene polymers or chain elongation using this polymer as the starting material, and besides by processes disclosed in, for example, Japanese Unexamined Patent Application Publication Nos. 61-197631, 61-215622, 61-215623, and 61-218632 and Japanese Examined Patent Application Publication Nos. 46-27250 and 59-15336.

The reactive silicon group may be introduced by a known method. Specifically, the following methods may be applied.

(1) A polyoxyalkylene polymer having a hydroxy group at its end is allowed to react with an organic compound having an active group reactive to the hydroxy group and an unsaturated group, and the product is allowed to react with a hydrosilane having a reactive silicon group to introduce the reactive silicon group to the end of the polymer.

(2) A polyoxyalkylene polymer having a functional group (hereinafter referred to as a Z functional group), such as hydroxy, epoxy, or isocyanate, is allowed to react with a compound having a reactive silicon group and a functional group (hereinafter referred to as a Z' functional group) reactive to the Z functional group to introduce the reactive silicon group to the end of the polymer.

Exemplary silicon compounds having a Z' functional group and a reactive silicon group include, but not limited to, amino group-containing silanes, such as γ-(2-aminoethyl)aminopropylmethoxysilane, γ-(2-aminoethyl)aminopropylmethyldimethoxysilane, and γ-aminopropyltriethoxysilane; mercapto group-containing silanes, such as γ-mercaptopropyltrimethoxysilane and γ-mercaptopropylmethyldimethoxysilane; epoxysilanes, such as γ-glycidoxypropyltrimethoxysilane and β-(3,4-epoxycyclohexyl)ethyltrimethoxysilane; vinyl-type unsaturated group-containing silanes, such as vinyltriethoxysilane, γ-methacryloyloxypropyltrimethoxysilane, and γ-acryloyloxypropylmethyldimethoxysilane; chlorine atom-containing silanes, such as γ-chloropropyltrimethoxysilane; isocyanate-containing silanes, such as γ-isocyanatepropyltriethoxysilane and γ-isocyanatepropylmethyldimethoxysilane; and hydrosilanes, such as methyldimethoxysilane, trimethoxysilane, and methyldiethoxysilane.

It is preferable to apply method (1) or a process of method (2) of allowing a polyoxyalkylene polymer having a hydroxy group at its end to react with a compound having an isocyanate group and a reactive silicon group, from the viewpoint of economical efficiency and reaction efficiency.

Any type of (meth)acrylic ester copolymers having a hindered amine structure may be used as the (meth)acrylic ester copolymer (hereinafter referred to as the copolymer (B)) in the present invention, as long as it has a chain formed by substantially copolymerizing at least two selected from among (meth)acrylic eater monomers, and a hindered ammine structure.

Preferably, a (meth)acrylic ester monomer unit of the copolymer (B) is expressed by Formula (V):

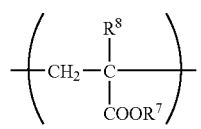

(where $R^7$ represents an alkyl group; $R^8$ represents a hydrogen atom or a methyl group; and if $R^8$ is a hydrogen atom, the monomer unit expressed by Formula (V) refers to an alkyl acrylate monomer unit).

The alkyl group of the (meth)acrylic ester monomer is not particularly limited, and may have a normal chain or a branched chain. Normally, the alkyl group has a carbon number in the range of 1 to 30.

Preferably, the copolymer (B) is prepared by copolymerizing monomers having an alkyl group with a carbon number of at least 8 (more preferably in the range of 10 to 20) in order to ensure compatibility with component (A).

The chain of the copolymer (B) is substantially composed of alkyl (meth)acrylate monomer units. The word "substantially" here means that the copolymer (B) contains more than 50 percent by weight of alkyl (meth)acrylate monomer units in total relative to the total amount of the monomer units in the copolymer (B). More preferably, the amount of alkyl (meth)acrylate monomer units is at least 70 percent by weight.

The copolymer (B) may contain other monomer units in addition to the alkyl (meth)acrylate monomer units. Specifically, those monomer units may contain a carboxylic group, such as an acrylic or methacrylic group; an amido group, such as an acrylamido, methacrylamido, N-methylolacrylamido, or N-methylolmethacrylamido group; an epoxy group, such as glycidyl acrylate or glycidyl methacrylate; and an amino group, such as diethylaminoethyl acrylate, diethylaminoethyl methacrylate, or aminoethyl vinyl ether, or they may be derived from acrylonitrile, styrene, alpha-methylstyrene, alkyl vinyl ether, vinyl chloride, vinyl acetate, vinyl propionate, or ethylene.

Preferably, the number average molecular weight (Mn) of the copolymer (B) is in the range of 1,000 to 60,000. A copolymer (B) having a number average molecular weight of more than 60,000 has a high viscosity, and is accordingly difficult to manufacture. On the other hand, a number average molecular weight of less than 1,000 undesirably results in a brittle cured material. The number average molecular weight of the copolymer (B) of the present invention was obtained in terms of polystyrene by gel permeation chromatography (GPC).

The copolymer (B) can be prepared by vinyl polymerization, for example, by vinyl polymerization using a radical reaction in which a monomer mixture is polymerized by solution polymerization, bulk polymerization, and other conventional processes. Specifically, a monomer mixture and optionally a radical initiator or the like are allowed to react at a temperature in the range of 50 to 150° C., optionally together with a chain transfer agent, such as n-dodecylmercaptan or t-dodecylmercaptan. A solvent may or may not be used. If it is used, nonreactive solvents, such as ethers, hydrocarbons, and acetic esters, are preferable from the viewpoint of sufficiently dissolving the monomer units.

Preferably, the copolymer (B) contains a reactive silicon group from the viewpoint of the curing properties and rubber elasticity. Exemplary groups as the reactive silicon group in the copolymer (B) include the same functional groups as the reactive silicon group in the polyoxyalkylene polymer (A), and the reactive silicon groups of the polyoxyalkylene polymer (A) and the copolymer (B) may be the same or different.

Preferably, the copolymer (B) has at least one reactive silicon group, more preferably 1.1 to 5, and still more preferably 1.1 to 3, in its molecule on an average. A copolymer (B) having less than one reactive silicon group in its molecule makes the curing properties insufficient and does not provide good rubber elasticity. On the other hand, a number of the reactive silicon groups of more than 5 hardens the resulting cured material to reduce the elongation undesirably.

The reactive silicon group may be present at an end of the chain of the copolymer (B) or inside the chain. If the reactive silicon group is present at an end of the chain, the number of the effective network chains of the copolymer (B) contained in the resulting cured material is increased, and accordingly a rubbery cured material can be easily provided, exhibiting a higher strength and elongation and a lower elasticity. Preferably, a number of the reactive silicon group are positioned so that the apparent number average molecular weight is in the range of 300 to 30,000, and more preferably in the range of 3,000 to 20,000, for each reactive silicon group molecule.

For introducing the reactive silicon group to the copolymer (B), various methods may be applied. For example, (i) a compound containing a polymerizable unsaturated bond and a reactive silicon group (for example, $CH_2=CHSi(OCH_3)_3$) is added to a monomer mixture to copolymerize; or (ii) a compound (for example, an acrylic acid) having a polymerizable unsaturated bond and a reactive functional group (hereinafter referred to as a Z group) is added to a monomer mixture to copolymerize, and the resulting copolymer is allowed to react with a compound (for example, a compound having a —$Si(OCH_3)_3$ group and an isocyanate group) having a reactive silicon group and a functional group (hereinafter referred to as a Z' group) reactive to the Z group.

The compound having a polymerizable unsaturated bond and a reactive silicon group used in method (i) may be expressed by Formula (VI):

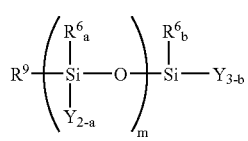

(VI)

(wherein $R^9$ represents an organic group containing a polymerizable unsaturated bond, and $R^6$, Y, a, b, and m are the same as above). Preferred one among the compounds expressed by Formula (VI) is expressed by, for example, Formula (VII):

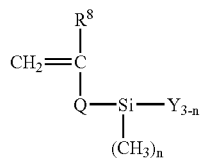

(VII)

(wherein $R^8$, Y, and n are the same as above, and Q represents a divalent organic group, such as —$COOR^{10}$— ($R^{10}$ represents a divalent alkylene group having a carbon number in the range of 1 to 6, such as —$CH_2$— or —$CH_2CH_2$—), —$CH_2C_6H_4CH_2CH_2$—, —$CH_2OCOC_6H_4COO(CH_2)_3$—, or a direct bond.)

Exemplary compounds expressed by Formula (VI) or (VII) include:

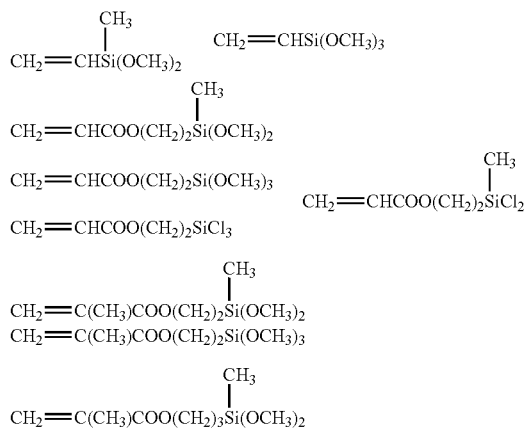

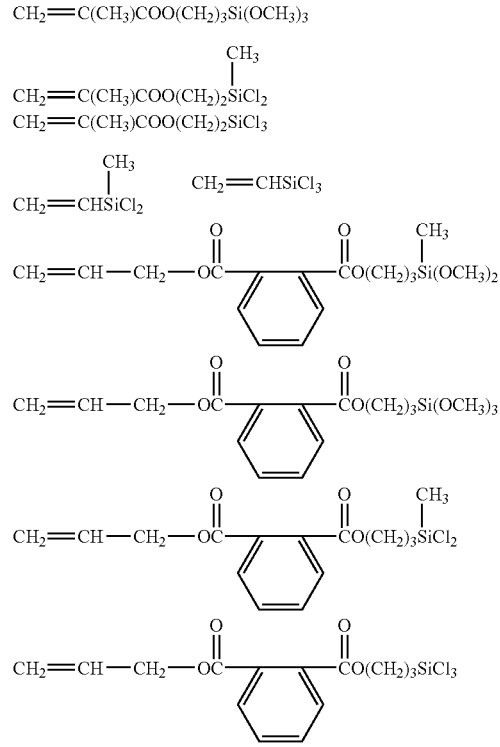

These compounds having a polymerizable unsaturated bond and a reactive silicon group can be prepared by various processes. For example, acetylene, allyl acrylate, allyl methacrylate, or diallyl phthalate is allowed to react with methyldimethoxysilane or methyldichlorosilane in the presence of a Group VIII transition metal complex catalyst. The transition metal complex catalyst is advantageously selected from the compounds of Group VIII transition metals consisting of platinum, rhodium, cobalt, palladium, and nickel.

There are various combinations of Z and Z' groups in method (ii), and an example is the combination of a vinyl group as the Z group and a hydrosilicon group (Si—H) as the Z' group. In this combination, the Z group and the Z' group are bonded by hydrosilylation.

Exemplary compounds having a polymerizable unsaturated bond and a vinyl group as the Z group include allyl acrylate, allyl methacrylate, diallyl phthalate, neopentyl glycol diacrylate, neopentyl glycol dimethacrylate, 1,5-pentanediol diacrylate, 1,5-pentanediol dimethacrylate, 1,6-hexanediol diacrylate, 1,6-hexanediol dimethacrylate, polyethylene glycol diacrylate, polyethylene glycol dimethacrylate, polypropylene glycol diacrylate, polypropylene glycol dimethacrylate, divinylbenzene, and butadiene. A typical compound having a reactive silicon group and a hydrosilicon group as the Z' group is expressed by Formula (VIII):

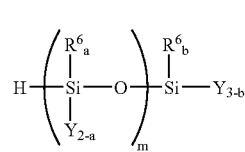

(VIII)

(wherein R⁶, Y, a, b, and m are the same as above) Exemplary compounds expressed by Formula (VIII) include halogenated silanes, such as trichlorosilane, methyldichlorosilane, dimethylchlorosilane, and trimethylsiloxydichlorosilane; alkoxysilanes, such as trimethoxysilane, triethoxysilane, methyldimethoxysilane, phenyldimethoxysilane, and 1,3,3,5,5,7,7-heptamethyl-1,1-dimethoxytetrasiloxane; acyloxysilanes, such as methyldiacetoxysilane and trimethylsiloxymethylacetoxysilane; ketoxymatesilanes, such as bis(dimethylketoximate)methylsilane, bis(cyclohexylketoximate)methylsilane, and bis(diethylketoximate)trimethylsiloxysilane; hydrosilanes, such as dimethylsilane, trimethylsiloxymethylsilane, and 1,1-dimethyl-2,2-dimethyldisiloxane; and alkenyloxysilanes, such as methyltri(isopropenyloxy)silane.

Highly reactive halogenated silanes prepared from inexpensive bases are readily used as the compound having a reactive silicon group and a hydrosilicon group acting as the Z' group. The copolymer (B) resulting from the use of halogenated silanes can be rapidly cured at room temperature by being exposed to the air, while generating hydrogen chloride. However, the hydrogen chloride causes problems of irritating odor and corrosion, and the use of halogenated silanes is therefore limited in practice. Accordingly, it is preferable that the halogen atom of the copolymer (B) is replaced with a hydrolyzable group or a hydroxy group. Exemplary hydrolyzable groups include alkoxyl, acyloxy, aminoxy, phenoxy, thioalkoxy, and amino.

For substituting an alkoxyl group for the halogen atom, the copolymer (B) is allowed to react with, for example, alcohol or phenol, such as methanol, ethanol, 2-methoxyethanol, sec-butanol, tert-butanol, or phenol; an alkali metal salt of alcohol or phenol; or an alkyl orthoformate, such as methyl orthoformate or ethyl orthoformate.

For substituting an acyloxy group for the halogen atom, the copolymer (B) is allowed to react with, for example, a carboxylic acid, such as acetic acid, propionic acid, or benzoic acid; or an alkali metal salt of a carboxylic acid.

For substituting an aminoxy group for the halogen atom, the copolymer (B) is allowed to react with, for example, a hydroxylamine, such as N,N-dimethylhydroxylamine, N,N-diethylhydroxylamine, N,N-methylphenylhydroxylamine, or N-hydroxypyrrolidine; or an alkali metal salt of a hydroxylamine.

For substituting a thioalkoxy group for the halogen atom, the copolymer (B) is allowed to react with, for example, a thioalcohol or thiophenol, such as ethylmercaptan or thiophenol; an alkali metal salt of a thioalcohol or thiophenol.

For substituting an amino group for the halogen atom, the copolymer (B) is allowed to react with, for example, a primary or secondary amine, such as N,N-dimethylamine, N,N-methylphenylamine, or pyrrolidine; or an alkali metal salt of a primary or secondary amine.

In addition to the halogen atom, other groups including alkoxyl and acyloxy groups may be replaced with a hydrolyzable or hydroxy group, such as amino or aminoxy, if necessary. The hydrolyzable group of the silyl group is replaced with another hydrolyzable group suitably at a temperature in the range of 50 to 150° C. Those substitutions can be carried out regardless of whether a solvent is used or not. If a solvent is used, nonreactive solvents, such as ethers, hydrocarbons, and acetic esters, are suitable from the viewpoint of sufficiently dissolving the raw materials.

The copolymer (B) has a hindered amine structure. The hindered amine structure has a reaction-hindering substituent at the 2- and/or 6-position carbon of piperidine. In a typical hindered amine structure, methyl groups are substituted for all the hydrogens at the 2- and 6-position carbons.

In order to introduce a hindered amine structure to a (meth)acrylic ester copolymer, at least one of its monomers is a reactive (polymerizable) hindered amine compound.

Preferably, the reactive hindered amine compound is expressed by Formula (I):

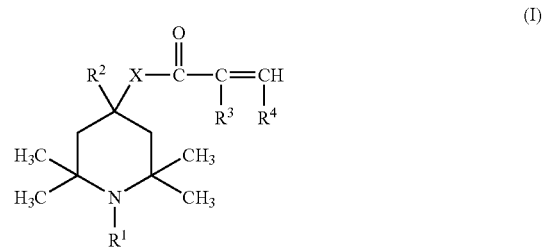

(wherein $R^1$ represents a hydrogen atom or an alkyl group having a carbon number in the range of 1 to 18, $R^2$ represents a hydrogen atom or a cyano group, $R^3$ represents a hydrogen atom or an alkyl group having a carbon number of 1 or 2, $R^4$ represents a hydrogen atom or an alkyl group having a carbon number of 1 or 2, and X represents an oxygen atom or an imino group). Examples of such hindered amine compounds include, but not limited to, 1,2,2,6,6-pentamethyl-4-piperidyl methacrylate, 1,2,2,6,6-pentamethyl-4-piperidyl acrylate, 2,2,6,6-tetramethyl-4-piperidyl methacrylate, 2,2,6,6-tetramethyl-4-piperidyl acrylate, 1,2,2,6,6-pentamethyl-4-iminopiperidyl methacrylate, 2,2,6,6-tetramethyl-4-iminopiperidyl methacrylate, 4-cyano-2,2,6,6-tetramethyl-4-piperidyl methacrylate, and 4-cyano-1,2,2,6,6-pentamethyl-4-piperidyl methacrylate.

By allowing the copolymer (B) to hold a hindered amine structure, the hindered amine acts effectively according to its amount used, and thus the resulting cured material can exhibit superior weather resistance for a long time.

Preferably, the amount of the reactive hindered amine compound used is at least 0.5 percent by weight, and more preferably at least 1 percent by weight, relative to the total amount of the monomers constituting the copolymer (B). Most preferably, at least 2 percent by weight is used. Preferably, the amount of reactive hindered amine compound is 10 percent by weight or less, and more preferably 5 percent by weight or less. A copolymerized reactive hindered amine compound content of more than 10 percent by weight may negatively affect the storage stability of the resulting resin. Use of less than 0.5 percent by weight of reactive hindered amine compound may disadvantageously reduce the effect of enhancing the weather resistance.

The above reactive hindered amine compounds may be used singly, or at lest two compounds may be copolymerized.

Preferably, the composition of the present invention contains 0.5 to 10 parts by weight of monomer containing the hindered amine structure derived from the reactive hindered amine compound, relative to 100 parts by weight of polyoxyalkylene polymer (A).

The copolymer (B) may not contain any UV-absorbable structure, such as that of benzotriazole, bisbenzotriazol, or triamidine.

In the present invention, the most preferred form of the copolymer (B) has a structure prepared by copolymerizing only the combination consisting of an alkyl (meth)acrylate, a compound having a polymerizable unsaturated bond and a reactive silicon group, and a reactive hindered amine compound.

Preferably, the content of the copolymer (B) in the curable composition of the present invention is at least 20 parts by weight, more preferably more than 20 parts by weight, and still more preferably at least 25 parts by weight, relative to 100 parts by weight of the polyoxyalkylene polymer (A) from the viewpoint of workability and the rubber elasticity of the curable composition. The upper limit is preferably 1,000 parts by weight, and more preferably 200 parts by weight.

The curable composition may contain a curing accelerator. Exemplary curing accelerators include, but not particularly limited to, titanate esters, such as tetrabutyl titanate and tetrapropyl titanate; tin carboxylates, such as dibutyltin dilaurate, dibutyltin maleate, dibutyltin diacetate, tin octylate, and tin naphthenate; organic tin compounds, such as products by a reaction of dibutyltin oxide with a phthalate ester and dibutyltin acetylacetonate; organic aluminium compounds, such as aluminium tris(acetylacetonate), aluminium tris(ethylacetoacetate), and diisopropoxyaluminium ethylacetoacetate; chelate compounds, such as zirconium tetraacetylacetonate and titanium tetraacetylacetonate; lead octylate; amines, such as butylamine, octylamine, laurylamine, dibutylamine, monoethanolamine, diethanolamine, triethanolamine, diethylenetriamine, triethylenetetraamine, oleylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 2-ethyl-4-methylimidazole, and 1,8-diazabicyclo(5.4.0)undecen-7 (DBU), and salts of these amines and carboxylic acids or the like; low molecular weight polyamide resins prepared from an excessive amount of polyamine and a polybasic acid; products by a reaction of an excessive amount of polyamine with an epoxy compound; silanol condensation catalysts, such as silane coupling agents containing an amino group, including γ-aminopropyltrimethoxysilane and N-(β-aminoethyl)aminopropylmethyldimethoxysilane; and other known silanol condensation catalysts, including acid catalysts and basic catalysts. These catalysts may be used singly or in combination.

The curing accelerator is used preferably in an amount in the range of 0.1 to 20 parts by weight to 100 parts by weight of the total of the polyoxyalkylene polymer (A) and the copolymer (B), and more preferably in the range of 1 to 10 parts by weight. An amount of the curing accelerator of less than 0.1 parts by weight may reduce curing rate and make the progress of curing reaction hard. On the other hand, an amount of the curing accelerator of more than 20 parts by weight causes heat or bubbles to be locally generated during curing, and consequently it becomes difficult to provide a superior cured material.

In use of the curable composition of the present invention, a filler may also be used optionally, and such fillers include reinforcements, such as fume silica, precipitable silica, silicic acid anhydride, hydrous silicic acid, and carbon black; other fillers, such as calcium carbonate, magnesium carbonate, diatomaceous earth, fired clay, clay, talc, titanium oxide, bentonite, organic bentonite, iron (III) oxide, zinc oxide, active hydrozincite, hydrogenated castor oil, and Shirasu-balloons; and fibrous fillers, such as asbestos, glass fiber, and filament.

For a particularly strong cured composition, 1 to 100 parts by weight of filler is used relative to 100 parts by weight of the total of the polyoxyalkylene polymer (A) and the copolymer (B) and the filler is selected from among fume silica, precipitable silica, silicic acid anhydride, hydrous silicic acid, carbon black, surface-treated fine calcium carbonate, fired clay, clay, active hydrozincite, and so forth. Thus, a satisfactory result is produced.

For a low-strength, high-elongation cured composition, 5 to 200 parts by weight of filler is used relative to 100 parts by weight of the total of the polyoxyalkylene polymer (A) and the composition (B) and the filler is selected from among titanium oxide, calcium carbonate, magnesium carbonate, talc, iron (III) oxide, zinc oxide, Shirasu-balloons, and so forth. Thus, a satisfactory result is produced.

The above-enumerated fillers may be used singly or in combination.

Use of a plasticizer in combination with filler in the curable composition of the present invention leads to an increased elongation and allows a large amount of filler to be blended, advantageously. Exemplary plasticizers include phthalate esters, such as dioctyl phthalate, dibutyl phthalate, and butylbenzyl phthalate; aliphatic dibasic esters, such as dioctyl adipate, isodecyl succinate, and dibutyl sebacate; glycol esters, such as diethylene glycol dibenzoate, and pentaerythritol esters; aliphatic esters, such as butyl oleate and methyl acetylricinolate; phosphate esters, such as tricresyl phosphate, trioctyl phosphate, and octyldiphenyl phosphate; epoxy plasticizers, such as epoxidized soybean oil, epoxidized linseed oil, and benzyl epoxystearate; polyester plasticizers such as polyesters of dibasic acids and dihydric alcohols; polyethers, such as polypropylene glycol and its derivatives; polystyrenes, such as poly(alpha-methylstyrene) and polystyrene; polybutadiene; butadiene-acrylonitrile copolymers; polychloroprene; polyisoprene; polybutene; and chlorinated paraffins. These plasticizers may be used singly or in combination.

The plasticizer is used preferably in an amount in the range of 0 to 100 parts by weight relative to 100 parts by weight of the total of the polyoxyalkylene polymer (A) and the copolymer (B).

In addition, various additives may be optionally used, such as an adhesion improver, a physical property adjuster, a storage stability improver, an antioxidant, a UV absorber, a metal-inactivating agent, an ozone degradation inhibitor, a light stabilizer, an amine-based radical chain terminator, a phosphorous peroxide decomposer, a lubricant, a pigment, and a blowing agent.

The process for preparing the curable composition of the present invention is not particularly limited, and common processes may be applied. For example, the above-described constituents may be blended and kneaded with a mixer, roll, or kneader at room temperature or with heating, or the constituents may be dissolved in a small amount of a suitable solvent to mix. Alternatively, a one-part or two-part composition may be used which comprises a combination appropriately including some of those constituents.

The curable composition of the present invention exposed to the air forms a three-dimensional network structure by the action of water, and thus cured into a solid having a rubber elasticity. The curable composition of the present invention can be used as elastic sealants, especially as building sealants, siding board sealants, and glazing sealants, in buildings, ships, automobiles, and roads. In addition, since the curable composition adheres, singly or with help of primer, to a wide variety of substrates, such as glass, porcelain, wood, metal, and resin compositions, it can be used for various types of sealing composition and adhesive composition. In application to adhesive, the curable composition can be used for one-part adhesives, two-part adhesives, contact adhesives which adhere after open time, and besides, it will be useful for paint, waterproof coating, food packaging material, cast rubber, material for making molds, and expanded material.

For use of the curable composition as building sealants and siding board sealants, it is preferable that the resulting cured material exhibit no crack in its surface for a long time through an accelerated weather resistance test using a sunshine WOM. The crack here refers to an obvious crack observed in a visual inspection of the surface state of a sheet after being exposed without load or deformation.

If a crack occurs in the resulting cured material in the accelerated weather resistance test using a sunshine WOM, the curable composition is likely to result in a defiled sealant in use for highly weather-resistant siding boards.

The weather resistance of the curable composition of the present invention can be set in combination with the constituents (A) and (B) and other constituents, especially antioxidant and UV absorber, while balancing with other practical properties.

BEST MODE FOR CARRYING OUT THE INVENTION

The present invention will be further described in detail with reference to the following examples, but the present invention is not limited to the examples. The number average molecular weight of each polymer was obtained in terms of polystyrene by gel permeation chromatography (GPC).

SYNTHESIS EXAMPLE 1

In a reaction vessel equipped with a stirrer was placed 800 g of a polyoxyalkylene with an average molecular weight of about 19,000 having an allyl ether group at an end of its molecular chain and subsequently $1 \times 10^{-4}$ [eq./vinyl group] of methyldimethoxysilane and chloroplatinic catalyst (chloroplatinic acid hexahydrate). Thus a reaction was performed at 90° C. for 2 hours. The resulting polymer was subjected to $^1$H-NMR analysis, and the proportion of a functional group at the end in the resulting polymer was about 77% (polymer A).

SYNTHESIS EXAMPLE 2

A solution containing 68 g of butyl acrylate, 8 g of methyl methacrylate, 20 g of stearyl methacrylate, 2 g of γ-methacryloxypropylmethyldimethoxysilane, 2 g of 1,2,2,6,6-pentamethyl-4-piperidinyl-methacrylate, 0.5 g of V-59 (produced by Wako Pure Chemical Industries), and 20 g of toluene was dripped into 50 g of toluene heated to 110° C. over a period of 4 hours to prepare a solution of a copolymer (polymer B) having a number average molecular weight of about 18,000 in toluene.

SYNTHESIS EXAMPLE 3

A solution containing 64g of butyl acrylate, 8 g of methyl methacrylate, 20 g of stearyl methacrylate, 6g of γ-methacryloxypropylmethyldimethoxysilane, 2 g of 1,2,2,6,6-pentamethyl-4-piperidinyl-methacrylate, 2.2 g of V-59 (produced by Wako Pure Chemical Industries), and 20 g of toluene was dripped into 50 g of toluene heated to 110° C. over a period of 4 hours to prepare a solution of a copolymer (polymer C) having a number average molecular weight of about 8,000 in toluene.

SYNTHESIS EXAMPLE 4

A solution containing 68 g of butyl acrylate, 10 g of methyl methacrylate, 20 g of stearyl methacrylate, 2 g of γ-methacryloxypropylmethyldimethoxysilane, 0.5 g of V-59 (produced by Wako Pure Chemical Industries), and 20 g of toluene was dripped into 50 g of toluene heated to 110° C. over a period of 4 hours to prepare a solution of a copolymer (polymer D) having a number average molecular weight of about 18,000 in toluene.

SYNTHESIS EXAMPLE 5

A solution containing 64 g of butyl acrylate, 10 g of methyl methacrylate, 20 g of stearyl methacrylate, 6 g of γ-methacryloxypropylmethyldimethoxysilane, 2.2 g of V-59 (produced by Wako Pure Chemical Industries), and 20 g of toluene was dripped into 50 g of toluene heated to 110° C. over a period of 4 hours to prepare a solution of a copolymer (polymer E having a number average molecular weight of about 8,000 in toluene.

EXAMPLE 1

Polymer A, as constituent (A), prepared in Synthesis Example 1 and the solution of polymer B, as constituent (B), in toluene prepared in Synthesis Example 2 were bended at a ratio (weight ratio) of 70/30 on a solid content basis, and heated under reduced pressure to remove the toluene. Thus, a transparent, viscous liquid was prepared. With 100 g of this resulting mixture were blended 140 g of colloidal calcium carbonate (produced by Shiraishi Kogyo, trade name: Hakuenka CCR), 13 g of ground calcium carbonate (produced by Shiraishi Calcium, trade name: Whiton S B), 86 g of a plasticizer (produced by Takeda Chemical Industries, trade name: Actcol P-23), 20 g of titanium oxide (produced by Ishihara Sangyo, trade name: Tipaque R-820), 2 g of an amide wax (produced by Kusumoto Chemicals, trade name: Disparlon 6500), 1 g of a benzotriazole UV absorbent b(produced by Ciba Specialty Chemicals, trade name: Tinuvin 327), and 0.5 g of carbon black (produced by Asahi Carbon, trade name: Carbon #70), and kneaded well with a triple paint roll to prepare a main agent. With the main agent were further blended 2 g of vinylmethoxysilane (produced by Nippon Unicar, trade name: A171), 3 g of 3-aminoethyl 3-aminopropyltrimethoxysilane (produced by Nippon Unicar, trade name: A-1120), and 2 g of dibutyltin diacetylacetonate (produced by Nitto Kasei, trade name: Neostann U-220) to prepare a compound.

The compound was formed into a sheet with a thickness of 3 mm, allowed to stand at 23° C. for 3 days, and then heated at 50° C. for 4 days to yield a rubber sheet. The rubber sheet on an aluminium plate with a thickness of 1 mm was placed in a sunshine weatherometer (produced by Suga Test Instruments) and the weather resistance was evaluated.

EXAMPLE 2

The weather resistance was evaluated in the same manner as in Example 1 except that polymer C was used as constituent (B)

EXAMPLE 3

The weather resistance was evaluated in the same manner as in Example 1 except that 1.25 g of an additive-type hindered amine light stabilizer, Sanol LS-770 (produced by Sankyo), was further added.

COMPARATIVE EXAMPLE 1

The weather resistance was evaluated in the same manner as in Example 1 except that polymer D was used as constituent (B).

COMPARATIVE EXAMPLE 2

The weather resistance was evaluated in the same manner as in Example 1 except that polymer E was used as constituent (B).

COMPARATIVE EXAMPLE 6

The weather resistance was evaluated in the same manner as in Example 1, except that polymer D was used as constituent (B) and 2.50 g of an additive-type hindered amine light stabilizer, Sanol LS-770 (produced by Sankyo), was further added.

COMPARATIVE EXAMPLE 7

The weather resistance was evaluated in the same manner as in Example 1 except that the ratio (weight ratio) of constituent (A) to constituent (B) was set at 85/15 on a solid content basis.

The results are shown in Table 1. In the table, deterioration time using SWOM means the time taken before the occurrence of a small crack in the surface of the sample which was subjected to exposure using the sunshine weatherometer and whose surface state was observed every 100 hours.

TABLE 1

| | | Example 1 | Example 2 | Example 3 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|---|
| Constituent (A) | Polymer A | 70 | 70 | 70 | 70 | 70 | 70 | 70 | 70 | 70 | 85 |
| Constituent (B) | Polymer B | 30 | — | 30 | — | — | — | — | — | — | 15 |
| | Polymer C | — | 30 | — | — | — | — | — | — | — | — |
| | Polymer D | — | — | — | 30 | — | 30 | 30 | 30 | 30 | — |
| | Polymer E | — | — | — | — | 30 | — | — | — | — | — |
| Additive-type hindered amine light stabilizer | LA-63 | — | — | — | — | — | 0.74 | — | 1.48 | — | — |
| | LS-770 | — | — | 1.25 | — | — | — | 1.25 | — | 2.50 | — |
| Deterioration time using SWOM (hour) | | 4700 | 4800 | 4700 | 1600 | 1700 | 1800 | 1700 | 1900 | 1700 | 800 |

COMPARATIVE EXAMPLE 3

The weather resistance was evaluated in the same manner as in Example 1 except that polymer D was used as constituent (B) and 0.74 g of an additive-type hindered amine light stabilizer, Mark LA-63 (produced by Asahi Denka Kogyo), was further added.

COMPARATIVE EXAMPLE 4

The weather resistance was evaluated in the same manner as in Example 1, except that polymer D was used as constituent (B) and 1.25 g of an additive-type hindered amine light stabilizer, Sanol LS-770 (produced by Sankyo), was further added.

COMPARATIVE EXAMPLE 5

The weather resistance was evaluated in the same manner as in Example 1, except that polymer D was used as constituent (B) and 1.48 g of an additive-type hindered amine light stabilizer, Mark LA-63 (produced by Asahi Denka Kogyo), was further added.

The results show that the curable compositions of Examples 1 to 3, which contain the copolymer (B) having a hindered amine structure, exhibit extremely higher weather resistance than the curable compositions of Comparative Examples 1 to 6, which simply contain a hindered amine compound.

The adhesions to a substrate of Example 1 and Comparative Examples 1, 3, and 7 were evaluated. Evaluation of the adhesion to a substrate was conducted as follows. Compounds were each placed on surface-cleaned electrolytically colored aluminium, acrylic-coated aluminium, glass, and vinyl chloride-coated steel and cured at 23° C. and 50% RH for 7 days. The adhesion between the resulting cured material and the substrates was evaluated by hand peeling. After curing at 23° C. and 50% RH for 7 days, the samples were immersed in warm water of 50° C. for 7 days. Then, after the water temperature reached 23° C., the adhesion under water-resistant conditions was evaluated in the same manner.

The results are shown in Table 2. In the table, C represents the cohesive failure of the sealant; A, peeling at the interface between the sealant and the substrate. The numbers represent their proportions and the sum of them is 100. A larger proportion of C means a higher adhesion.

TABLE 2

| | | Example 1 | Comparative Example 1 | Comparative Example 3 | Comparative Example 7 |
|---|---|---|---|---|---|
| Constituent (A) | Polymer A | 70 | 70 | 70 | 85 |
| Constituent (B) | Polymer B | 30 | — | — | 15 |
| | Polymer C | — | — | — | — |
| | Polymer D | — | 30 | 30 | — |
| | Polymer E | — | — | — | — |
| Additive-type hindered amine light stabilizer | LA-63 | — | — | 0.74 | — |
| | LS-770 | — | — | — | — |
| Adhesion to substrate under dried conditions | Second electrolytic colored aluminum | C100A0 | C100A0 | C100A0 | C100A0 |
| | acrylic-coated aluminum | C70A30 | C0A100 | C0A100 | C30A70 |
| | Glass | C100A0 | C100A0 | C100A0 | C100A0 |
| | Vinyl chloride-coated steel sheet | C100A0 | C100A0 | C100A0 | C100A0 |
| Adhesion to substrate water-resistant conditions | Second electrolytic colored aluminium | C20A80 | C0A100 | C80A20 | C0A100 |
| | Glass | C80A20 | C60A40 | C80A20 | C80A20 |
| | Vinyl chloride-coated steel sheet | C50A50 | C0A100 | C0A100 | C40A60 |
| Evaluation result number of C0A100 | | 0/7 | 3/7 | 2/7 | 1/7 |

Example 1 exhibits an adhesion superior to Comparative Examples 1 and 3, as shown in Table 2, in addition to superior weather resistance. Also, Comparative Example 7, which contains less than 20 parts by weight of constituent (B), is inferior to Example 1 in weather resistance and adhesion.

INDUSTRIAL APPLICABILITY

The present invention provides a curable composition containing a polyoxyalkylene polymer (A) having a reactive silicon group and a (meth)acrylic ester copolymer (B) having a hindered amine structure. The curable composition exhibits superior weather resistance for a long time.

The invention claimed is:

1. A curable composition comprising: 100 parts by weight of a polyoxyalkylene polymer (A) having at least one functional group containing silicon, the functional group being crosslinked by forming a siloxane bond; and at least 25 to 1,000 parts by weight of a (meth)acrylic ester copolymer (B) having a hindered amine structure, wherein the (meth)acrylic ester copolymer (B) is formed from a monomer mixture comprising (meth)acrylic ester and a copolymerizable hindered amine compound.

2. A curable composition according to claim 1, wherein the (meth)acrylic ester copolymer (B) is prepared by copolymerizing a reactive hindered amine compound expressed by Formula (I):

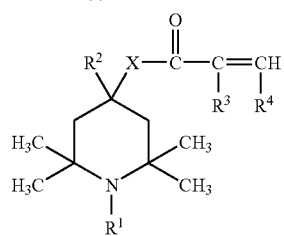

(I)

(Where $R^1$ represents a hydrogen atom or an alkyl group having a carbon number in the range of 1 to 18, $R^2$ represents a hydrogen atom or a cyano group, $R^3$ represents a hydrogen atom or an alkyl group having a carbon number of 1 or 2, $R^4$ represents a hydrogen atom or an alkyl group having a carbon number of 1 or 2, and X represents an oxygen atom or an amino group).

3. A curable composition according to claim 1, wherein at least one of (methyl)acrylic ester monomer units constituting the (meth)acrylic ester copolymer (B) has an alkyl group having a carbon number of 8 or more.

4. A curable composition according to claim 1, wherein the (meth)acrylic ester copolymer (B) is prepared by copolymerizing a vinyl monomer containing a reactive silicon group.

5. A curable composition according to claim 1, wherein the functional group containing silicon of the polyoxyalkylene polymer (A) is a reactive alkoxysilyl group.

6. A curable composition according to claim 1, wherein the (meth)acrylic ester copolymer (B) contains 0.5 to 10 parts by weight of a monomer unit containing the hindered amine structure relative to 100 parts by weight of the polyoxyalkylene polymer (A).

7. A curable composition according to claim 1, wherein the (meth)acrylic ester copolymer (B) has a structure formed by copolymerizing only the (meth)acrylic ester, a compound having a polymerizable unsaturated bond and a reactive silicon group, and a the copolymerizable hindered amine compound.

* * * * *